Feb. 16, 1926.
W. J. HILL ET AL
1,573,342
COMBINED WATER GAUGE ILLUMINATOR AND PROTECTOR
Filed March 13, 1924   2 Sheets-Sheet 1
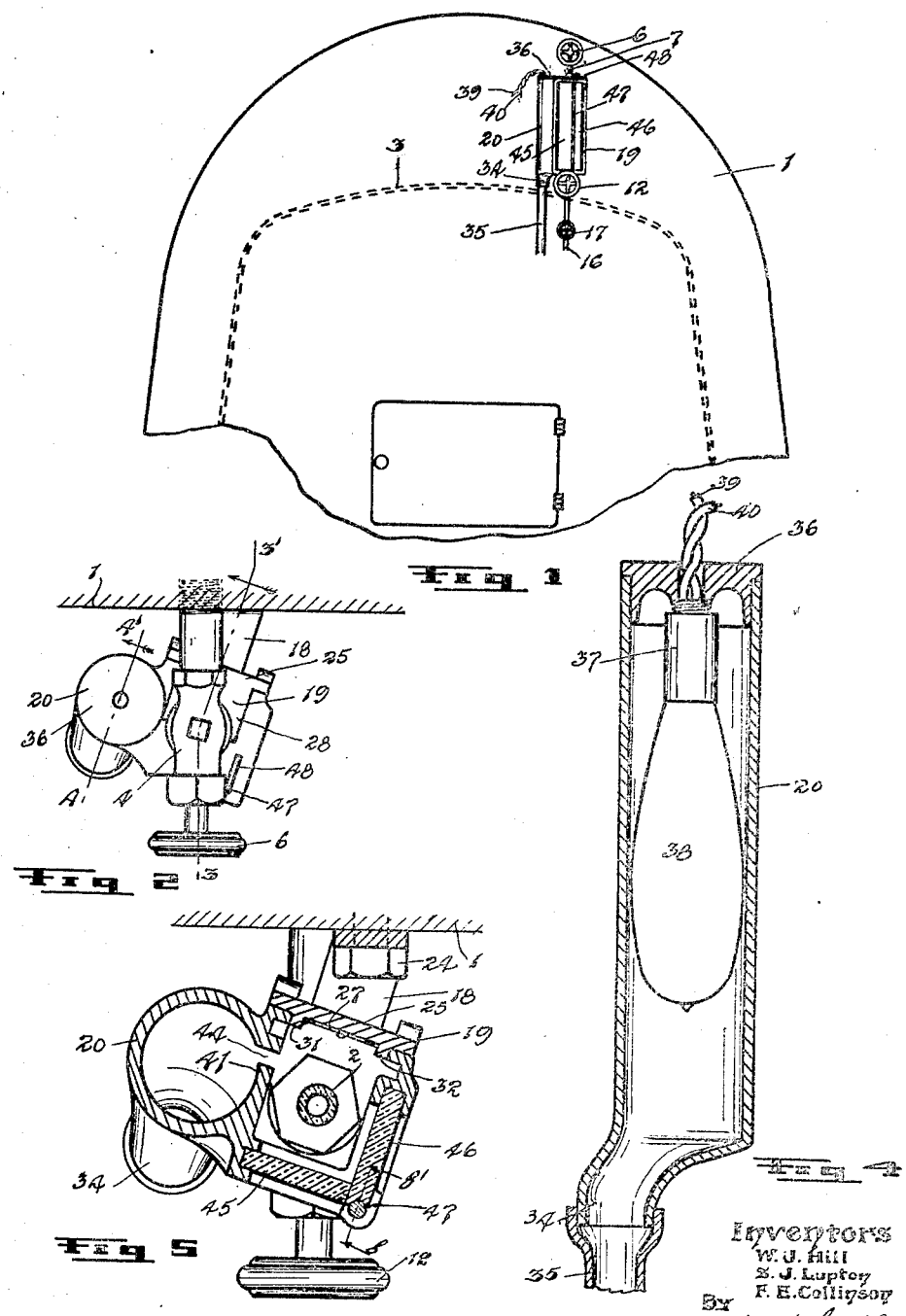
Inventors
W. J. Hill
S. J. Lupton
F. E. Collinson Feb. 16, 1926.  
W. J. HILL ET AL  
1,573,342  
COMBINED WATER GAUGE ILLUMINATOR AND PROTECTOR  
Filed March 13, 1924 2 Sheets-Sheet 2
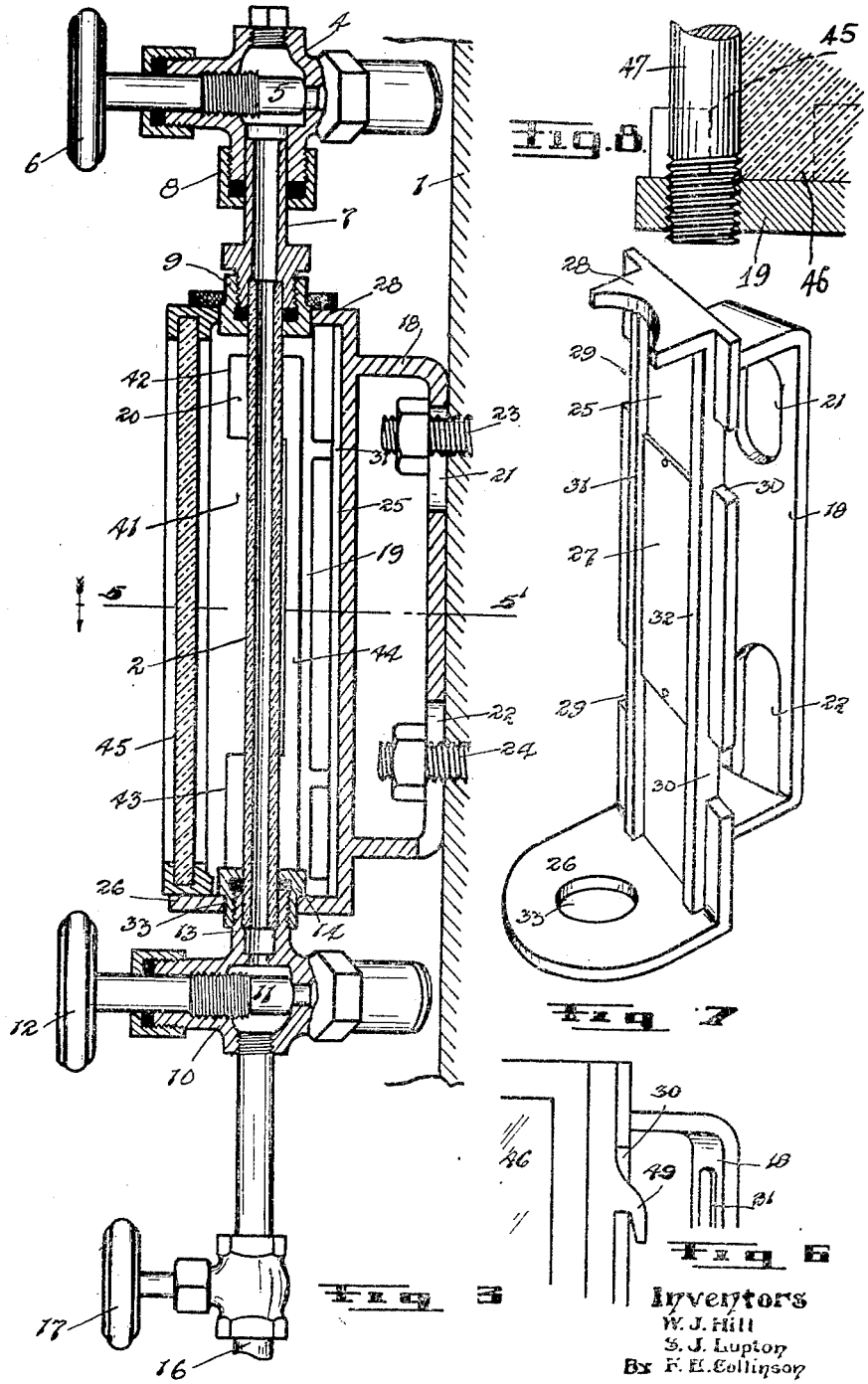
Inventors  
W. J. Hill  
S. J. Lupton  
By F. H. Collinson Patented Feb. 16, 1926.

1,573,342

UNITED STATES PATENT OFFICE.

WILLARD J. HILL, SAMUEL J. LUPTON, AND FRANCIS E. COLLINSON, OF WINNIPEG, MANITOBA, CANADA, ASSIGNORS TO SAID HILL.

COMBINED WATER-GAUGE ILLUMINATOR AND PROTECTOR.

Application filed March 13, 1924. Serial No. 699,129.

*To all whom it may concern:*

Be it known that we, WILLARD J. HILL, SAMUEL J. LUPTON, and FRANCIS E. COLLINSON, all of the city of Winnipeg, in the Province of Manitoba, Canada, have jointly invented certain new and useful Improvements in Combined Water-Gauge Illuminators and Protectors, of which the following is the specification.

The invention relates to improvements in combined water gauge illuminators and protectors and an object of the invention is to provide a device to be used in connection with the water gauge glass of a steam boiler and which is designed to protect observers from being struck by flying glass in the event of the water gauge glass breaking, to permit of the escape of water, steam and broken glass through an outlet pipe provided in the event of the glass breaking and to effectively illuminate the water gauge glass and without glare so that the height of the water can at all times be clearly seen and through a range of approximately one hundred and twenty degrees.

A further object of the invention is to design the device so that it can be readily mounted in place on the boiler or water gauge glass mounting, so that the illuminating lamp is shielded from flying glass in the event of the water gauge glass breaking, so that the water gauge glass is enclosed within a casing having a glass front or shield, the glasses of which can be readily removed and such that the protector can be removed from the supporting bracket without having to use tools for the removal of nuts or other fittings and such that the protector will make close fitting joints, thereby preventing any undue escape of steam or water in the event of the water gauge glass breaking.

A further object is to design the device so that the lamp casing and the protector are integrally formed and can be so arranged on the device that the light from the lamp is directed to a mirror or reflector which reflects the light directly onto the water gauge glass, the lamp being shielded.

With the above more and other minor objects in view, the invention consists essentially in the arrangement and construction of parts hereinafter more particularly described, reference being had to the accompanying drawings in which:

Fig. 1 is a face view of the device as it appears on the boiler head.

Fig. 2 is an enlarged detailed plan view of the device.

Fig. 3 is a vertical sectional view at 3—3' Figure 2 and looking in the direction of the applied arrow.

Fig. 4 is a vertical sectional view at 4—4' Figure 2 and looking in the direction of the applied arrow.

Fig. 5 is a horizontal sectional view at 5—5' Figure 3.

Fig. 6 is a side view of a portion of the upper part of the device.

Fig. 7 is a perspective view of the bracket and enclosure plate.

In the drawings like characters of reference indicate corresponding parts in the several figures.

Locomotive and other boilers are provided with water gauge glasses which the engineer can observe to determine the height of the water in the boiler. These sometimes break and it is obviously desirable that the engineer be protected from flying glass, steam and water and further it is desirable that under normal conditions the engineer should be enabled to clearly see the height of water in the water gauge glass.

The present invention relates to a device which will protect the engineer from being scalded should the glass break and which will effectively illuminate the water column. The structural details of the device are arranged so that they also give very important advantages hereinbefore set forth and later explained.

The boiler head 1 carries the customary mountings for the water gauge glass 2 and the mountings and glass are arranged with due respect to the crown sheet 3 and as required by practice There is an upper and a lower mounting for the water gauge glass, both of which are quite similar. The upper mounting comprises a valve body 4 which screw threads into the boiler head and is provided with a valve 5 which can be opened and closed by manipulating the valve handle 6. A gauge stem 7 is attached to the valve casing, being held in place by a suitable packing nut 8 and the upper end of the water gauge glass 2 is fastened to the lower end of the stem 7 by a packing nut 9.

The lower mounting comprises a valve body 10 which is screw threaded into the head of the boiler and contains a valve 11 provided with a valve handle 12 whereby the same can be opened and closed. A screw threaded nipple 13 opens to the top side of the valve body and is connected by a packing nut 14 to the lower end of the water gauge glass. A pipe leads from the under side of the valve body 10 and connects with a waste pipe 16, a suitable waste pipe valve 17 being provided to allow the waste waters to drain off upon such valve being opened.

The above parts are of ordinary construction and are as now used on locomotives. They may vary somewhat in detail in various types, but our device can be used on the various types.

The combined water gauge illuminator and protector which we provide embodies what might be termed three main parts, a bracket 18, a water gauge glass protector 19 and a lamp casing 20, the protector and lamp casing being integrally formed and the bracket detachably connected to the latter two parts.

The bracket 18 is provided with suitable slots 21 and 22 through which studs 23 and 24 pass, the studs fastening the bracket to the boiler head and the slots permitting vertical adjustment of the bracket to accommodate the water gauge glass. The bracket carries a closure plate 25 having a horizontal lower extension 26 forming a closure bottom for the protector, a reflector or mirror 27, a top horizontally disposed saddle 28, upper and lower pairs of side notches 29 and 30 and vertically disposed pairs of webs 31 and 32 forming guides. The extension 26 is formed with a central opening 33. When the bracket is fastened to the boiler, the opening 33 receives the lower packing nut 14 and the saddle 28 sits half around the upper packing nut 9.

The lamp casing is cylindrical in form and is provided at the lower end with a drain nipple 34 which communicates with the drain pipe 35. The top end of the lamp casing is closed by a plug 36 which carries the customary electric lamp socket 37, the socket being fitted with an electric lamp 38 and with lead wires 39 and 40 which pass from the plug to a suitable source of current. As before stated the lamp casing is integrally formed with the gauge protector and accordingly the one side of the lamp casing forms a side of the water gauge glass protector.

The water gauge glass protector which is substantially square in horizontal section and is positioned angularly of the boiler, has metallic sides next the boiler, one of which is closed by the plate 25, whilst the sides remote from the boiler are fitted with glass plates through which the water gauge glass can be seen. The side of the protector next the lamp casing is provided with a metallic wing 41 which is adapted to guard the lamp from being broken by flying glass should the gauge glass break. Above and below the web are escape openings 42 and 43 for steam, these being connected at the side towards the boiler by a vertical slot 44 which permits the light rays from the lamp to shine directly on the reflector 27 which is behind the gauge glass.

The front sides of the protector are provided with guides which receive slidably the edges of transparent plates 45 and 46 such as of plate glass, and these plates are retained in place by a vertical rod 47 fitted at the upper end with a finger piece 48 and having the lower end screw threading into the lower part of the protector. The latter arrangement is such that if one has unscrewed and withdrawn the rod, the glass plates can be taken out one after the other as the edge of the one glass overlaps the edge of the other.

One side of the protector next the boiler is provided with upper and lower sets of catches 49, these being adapted to enter the notches of the plate 25 and catch the same upon the protector being pushed down in respect to the plate 25. The webs 31 and 32 pass to the inner side of the protector when the same is in place.

We wish it to be particularly noted that the bracket is so designed that the protector sits in an angular position and that the lamp casing is, so to speak, behind the protector. By such construction the engineer is given an unobstructed view of the water gauge glass through a range of one hundred and twenty degrees and the gauge glass is effectively illuminated in all positions by the reflected light from the mirror or reflector.

The construction also provides for the removal of the protector and the lamp casing without having to dismount the bracket as it is simply a matter of raising the integrally formed protector and lamp casing to permit the catches to escape through the slots of the plate 25.

In event of the water gauge glass breaking, the lamp is fully protected from flying glass. The steam, hot water and loose glass are free to quickly escape to the over-flow pipe 35. The broken glass is retained within the protector and the engineer is effectively protected from escaping steam and hot water, this latter being due to the close fitting joints formed between the various parts by virtue of their structure. We might here remark that the packing nuts 9 and 14 which are usually hexagonal are made round for a portion of their length, so as to fit snugly in place within the opening 33 and between the saddle 28 and the complementary semi-circular upper end of the protector.

A device of this kind can also be mounted on the water column of a locomotive boiler instead of on the boiler head and in such a case the arrangement would be such that the device would take the same angular position in respect to the boiler so that the engineer would have full vision through a range of one hundred and twenty degrees in the manner hereinbefore explained.

We have not considered it necessary to show the device applied on the water gauge column as such latter is well known and anyone familiar with the article could easily effect the mounting of the device on the water gauge column.

What we claim as our invention is:

1. The combination with a water gauge glass, of a combined water gauge illuminator and protector comprising a permanently mounted bracket and an integrally formed lamp containing casing and water gauge glass protector detachably carried by the bracket.

2. The combination with a boiler water gauge glass, of a combined water gauge illuminator and protector comprising a stationary supporting bracket and an integrally formed lamp containing casing and water gauge glass protector, the casing and protector being demountably carried by the bracket and being angularly positioned in respect to the boiler.

3. The combination with a boiler water gauge glass, of a combined water gauge illuminator and protector comprising a permanently mounted bracket and an integrally formed lamp containing casing and water gauge glass protector demountably carried by the bracket, the protector enclosing the water gauge glass and having transparent sides remote from the boiler and the lamp casing having a discharge pipe leading from the bottom thereof.

4. The combination with a boiler water gauge glass, of a combined water gauge illuminator and protector comprising a permanently mounted supporting bracket, an integrally formed lamp containing casing and water gauge glass protector demountably carried by the bracket and positioned angularly in respect to the boiler and a discharge pipe leading from the bottom of the lamp casing.

5. A combined water gauge illuminator and protector for a boiler comprising a protector enclosing the water gauge glass and positioned angularly in respect to the boiler and having the sides thereof remote from the boiler transparent, a lamp containing casing located at one side of the protector and having a guard interposed between the lamp and the water gauge glass and a light slot, a discharge pipe leading from the bottom of the lamp casing and a reflector mounted within the protector behind the water gauge glass and adapted to reflect the light rays passing through the slot on to the water column within the glass.

6. A combined water gauge illuminator and protector for a boiler comprising a protector enclosing the water gauge glass and supported in an angular position in respect to the boiler and having the sides thereof remote from the boiler transparent, a lamp containing casing closing one side of the protector and having top and bottom escape openings therein communicating with the interior of the protector and a vertical light slot connecting such openings, a discharge pipe communicating with the bottom of the lamp casing and a reflector contained within the protector to the rear of the water gauge glass and adapted to reflect the light rays emanating from the lamp on to the water column in the water gauge glass.

7. A combined water gauge illuminator and protector for a boiler comprising a supporting bracket carrying a vertically disposed closure plate having top and bottom horizontal extensions, the bottom extension being provided with an opening receiving the lower mounting of the water gauge glass, the upper extension being in the form of a saddle engaging the upper mounting of the gauge glass and an integrally formed lamp containing casing and water gauge glass protector detachably secured to the closure plate, the bottom of the protector being closed by the bottom extension of the closure plate and the top of the protector cooperating with the saddle like extension of the plate to close the top of the protector and surround the upper water gauge glass mounting.

8. A combined water gauge illuminator and protector for a boiler comprising a supporting bracket carrying a vertically disposed closure plate having top and bottom horizontal extensions, the bottom extension being provided with an opening receiving the lower mounting of the gauge glass, the upper extension being in the form of a saddle engaging the upper mounting of the gauge glass and an integrally formed lamp containing casing and water gauge glass protector detachably secured to the closure plate, the back of the protector being closed by the closure plate and the top thereof cooperating with the saddle to close around the top mounting of the gauge glass.

9. A combined water gauge illuminator and protector for a boiler, comprising an integrally formed lamp casing and water gauge glass protector, the protector being substantially square in horizontal section and having one of the rear sides opening to the lamp casing and provided with a web protecting the lamp and forming upper and lower steam escape openings and a light slot therebetween, the other of the rear sides open to permit of the passing of the water gauge glass within the protector, the front sides thereof transparent and the upper and lower ends thereof provided with semi-circular bearings engaging the gauge glass mountings, a discharge pipe leading from the bottom of the lamp casing, a closure plate on which the protector is detachably mounted, said closure plate closing the open side of the protector and having a bottom horizontal extension through which the lower gauge glass mounting extends and an upper horizontal saddle like extension co-operating with the top of the protector to enclose the upper gauge glass mounting, a supporting bracket permanently attached to the rear of the closure plate and a mirror on the front face of the closure plate adapted to reflect the light rays emanating through the light slot on to the water column within the gauge glass.

Signed at Winnipeg, this 14th day of February, 1924.

WILLARD J. HILL.
SAMUEL J. LUPTON.
FRANCIS E. COLLINSON.